US012695335B2

(12) United States Patent

Henry et al.

(10) Patent No.: US 12,695,335 B2
(45) Date of Patent: Jul. 28, 2026

(54) SCHEDULING TRANSMISSIONS FROM AMBIENT POWER DEVICES

(71) Applicant: Cisco Technology, Inc., San Jose, CA (US)

(72) Inventors: Jerome Henry, Pittsboro, NC (US); Matthew Silverman, Shaker Heights, OH (US); Amine Choukir, Ecublens (CH); Domenico Ficara, Essertines-sur-Yverdon (CH); Ugo Campiglio, Ecublens (CH); Juan Carlos Zuniga, Montreal (CA); Robert Barton, Vancouver (CA); Sachin D. Wakudkar, Ecublens (CH); Malcolm Smith, Richardson, TX (US); Indermeet Gandhi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 11 days.

(21) Appl. No.: 18/597,902

(22) Filed: Mar. 6, 2024

(65) Prior Publication Data

US 2025/0219466 A1 Jul. 3, 2025

Related U.S. Application Data

(60) Provisional application No. 63/615,717, filed on Dec. 28, 2023.

(51) Int. Cl.

| | |
|---|---|
| *H02J 50/80* | (2016.01) |
| *H02J 7/44* | (2026.01) |
| *H02J 7/50* | (2026.01) |
| *H02J 7/92* | (2026.01) |
| *H02J 50/40* | (2016.01) |
| *H04W 72/1268* | (2023.01) |

(52) U.S. Cl.
CPC ............... *H02J 50/80* (2016.02); *H02J 7/44* (2026.01); *H02J 7/50* (2026.01); *H02J 7/92* (2026.01);

(Continued)

(58) Field of Classification Search
CPC ........ H02J 50/80; H02J 50/40; H02J 7/00036; H02J 7/0071; H02J 7/0013; H04W 72/1268

(Continued)

(56) References Cited

U.S. PATENT DOCUMENTS

| | | | | |
|---|---|---|---|---|
| 8,686,685 B2 * | 4/2014 | Moshfeghi | .............. | H02J 50/12 |
| | | | | 320/108 |
| 8,760,113 B2 * | 6/2014 | Keating | .................. | H02J 50/12 |
| | | | | 320/108 |

(Continued)

FOREIGN PATENT DOCUMENTS

WO 2022170267 A1 11/2022

OTHER PUBLICATIONS

International Search Report and Written Opinion for International Application No. PCT/US2024/058017, mailed Mar. 17, 2025, 19 Pages.

(Continued)

*Primary Examiner* — Alfonso Perez Borroto
(74) *Attorney, Agent, or Firm* — Rutan & Tucker, LLP; Ravi Mohan; Marc McClain

(57) ABSTRACT

Devices, networks, systems, methods, and processes for scheduling transmissions from a plurality of ambient power devices are described herein. An Access Point (AP) may determine whether one or more ambient power devices are overlapping or non-overlapping based on one or more device characteristics associated with the one or more ambient power devices. The AP may transmit, to a wireless device, a charging instruction signal based on the one or more device characteristics. The one or more ambient power devices may receive one or more charging frames from the wireless device. The wireless device can receive one or more uplink frames and relay the one or more uplink frames to the (Continued)

AP. The AP may record the one or more charging frames, generate one or more charging profiles for the one or more ambient power devices, and develop an energy management strategy based on the one or more charging profiles.

19 Claims, 9 Drawing Sheets

(52) U.S. Cl.
CPC ......... *H02J 50/40* (2016.02); *H04W 72/1268*
(2013.01)

(58) Field of Classification Search
USPC ........................................................ 307/149
See application file for complete search history.

(56) References Cited

U.S. PATENT DOCUMENTS

| | | | | |
|---|---|---|---|---|
| 9,553,473 | B2 * | 1/2017 | Zeine ...................... | H02J 50/27 |
| 9,774,086 | B2 * | 9/2017 | Cook ..................... | H01Q 7/005 |
| 10,141,791 | B2 * | 11/2018 | Bell ........................ | H02J 50/20 |
| 2010/0253281 | A1 | 10/2010 | Li | |
| 2015/0084584 | A1 * | 3/2015 | Monks .................... | H02J 50/80 |
| | | | | 320/108 |
| 2015/0194838 | A1 * | 7/2015 | Won .......................... | H02J 7/50 |
| | | | | 320/108 |
| 2015/0326068 | A1 * | 11/2015 | Bell ........................ | H02J 50/90 |
| | | | | 307/149 |
| 2016/0013677 | A1 * | 1/2016 | Bell ........................ | H04W 4/80 |
| | | | | 307/104 |
| 2020/0044485 | A1 | 2/2020 | Smith et al. | |
| 2020/0212956 | A1 | 7/2020 | Gollakota et al. | |
| 2020/0296780 | A1 * | 9/2020 | Zeine .................... | H04L 5/0051 |
| 2021/0368439 | A1 | 11/2021 | Karimaruthumkal et al. | |
| 2023/0176207 | A1 | 6/2023 | Kimionis et al. | |

OTHER PUBLICATIONS

Fatemeh Rezaei, Chintha Tellambura, and Sanjeewa Herath, Large-Scale Wireless-Powered Networks With Backscatter Communications—A Comprehensive Survey, Aug. 17, 2020.

* cited by examiner

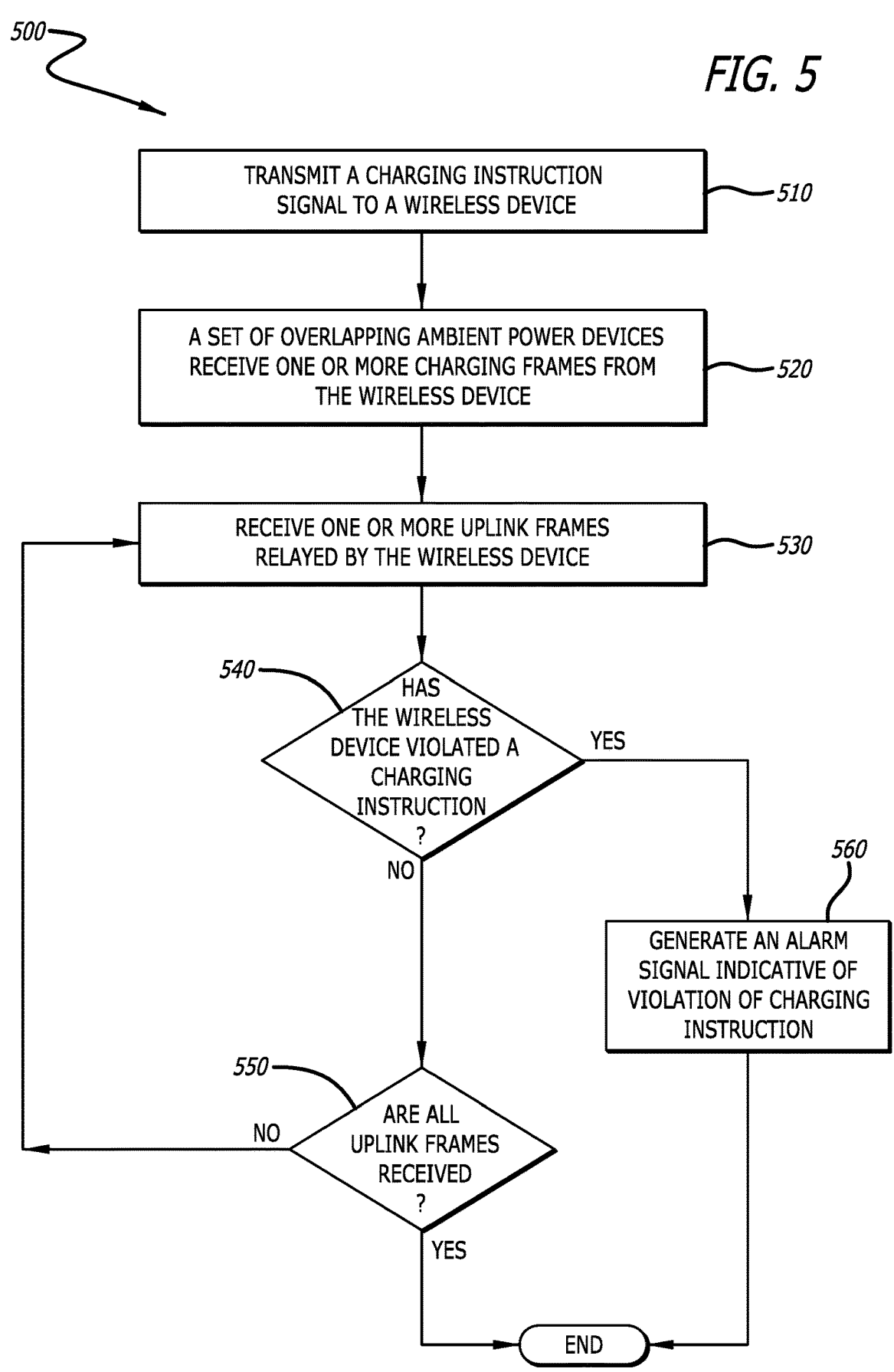

TRANSMIT A CHARGING INSTRUCTION
SIGNAL TO A WIRELESS DEVICE ———510

A SET OF OVERLAPPING AMBIENT POWER DEVICES
RECEIVE ONE OR MORE CHARGING FRAMES FROM
THE WIRELESS DEVICE ———520

RECEIVE ONE OR MORE UPLINK FRAMES
RELAYED BY THE WIRELESS DEVICE ———530

540
HAS
THE WIRELESS
DEVICE VIOLATED A
CHARGING
INSTRUCTION
?

YES

NO

560
GENERATE AN ALARM
SIGNAL INDICATIVE OF
VIOLATION OF CHARGING
INSTRUCTION

550
ARE ALL
UPLINK FRAMES
RECEIVED
?

NO

YES

END

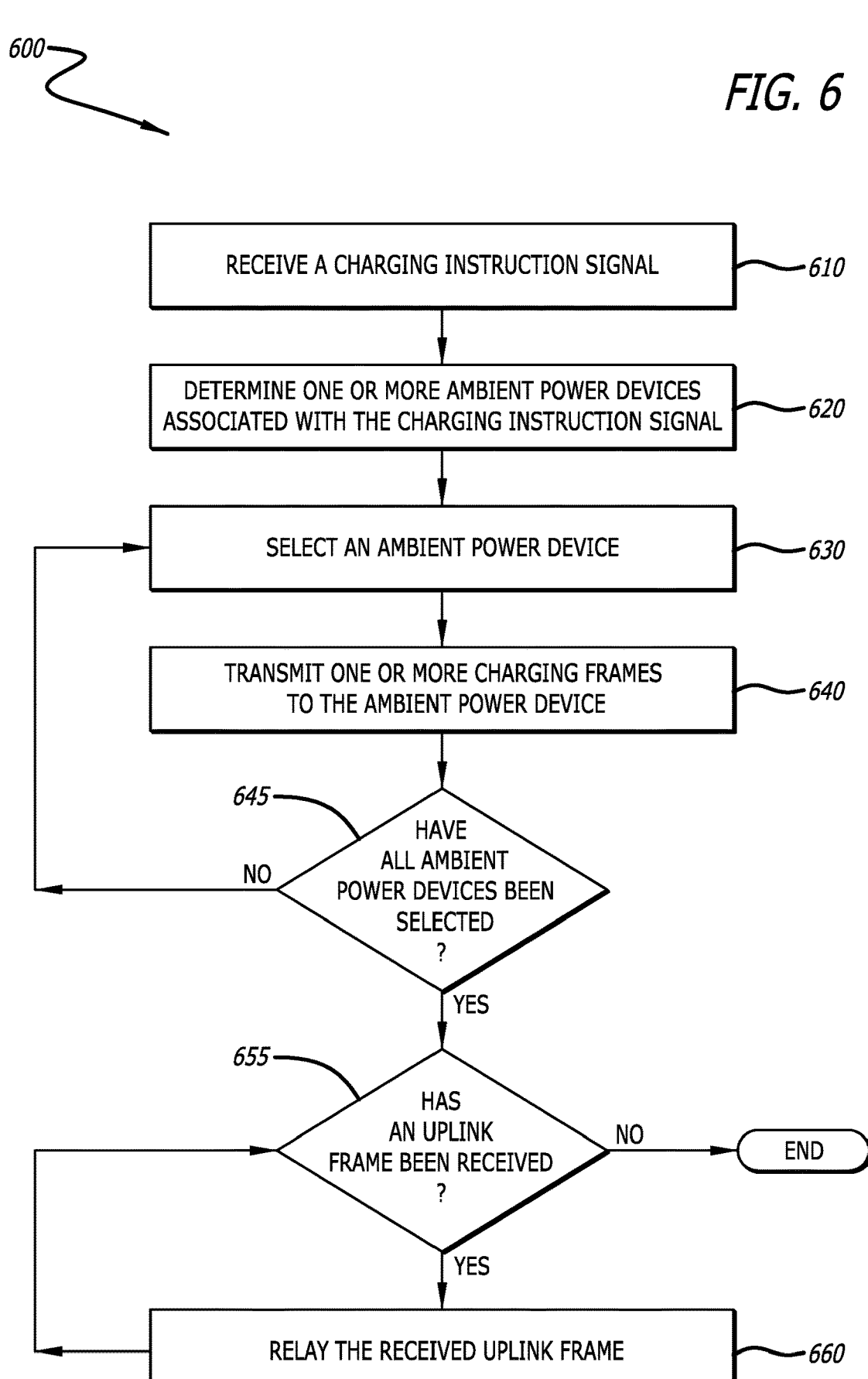

RECEIVE A CHARGING INSTRUCTION SIGNAL ~610

DETERMINE ONE OR MORE AMBIENT POWER DEVICES ASSOCIATED WITH THE CHARGING INSTRUCTION SIGNAL ~620

SELECT AN AMBIENT POWER DEVICE ~630

TRANSMIT ONE OR MORE CHARGING FRAMES TO THE AMBIENT POWER DEVICE ~640

645

HAVE ALL AMBIENT POWER DEVICES BEEN SELECTED ?

NO

YES

655

HAS AN UPLINK FRAME BEEN RECEIVED ?

NO — END

YES

RELAY THE RECEIVED UPLINK FRAME ~660

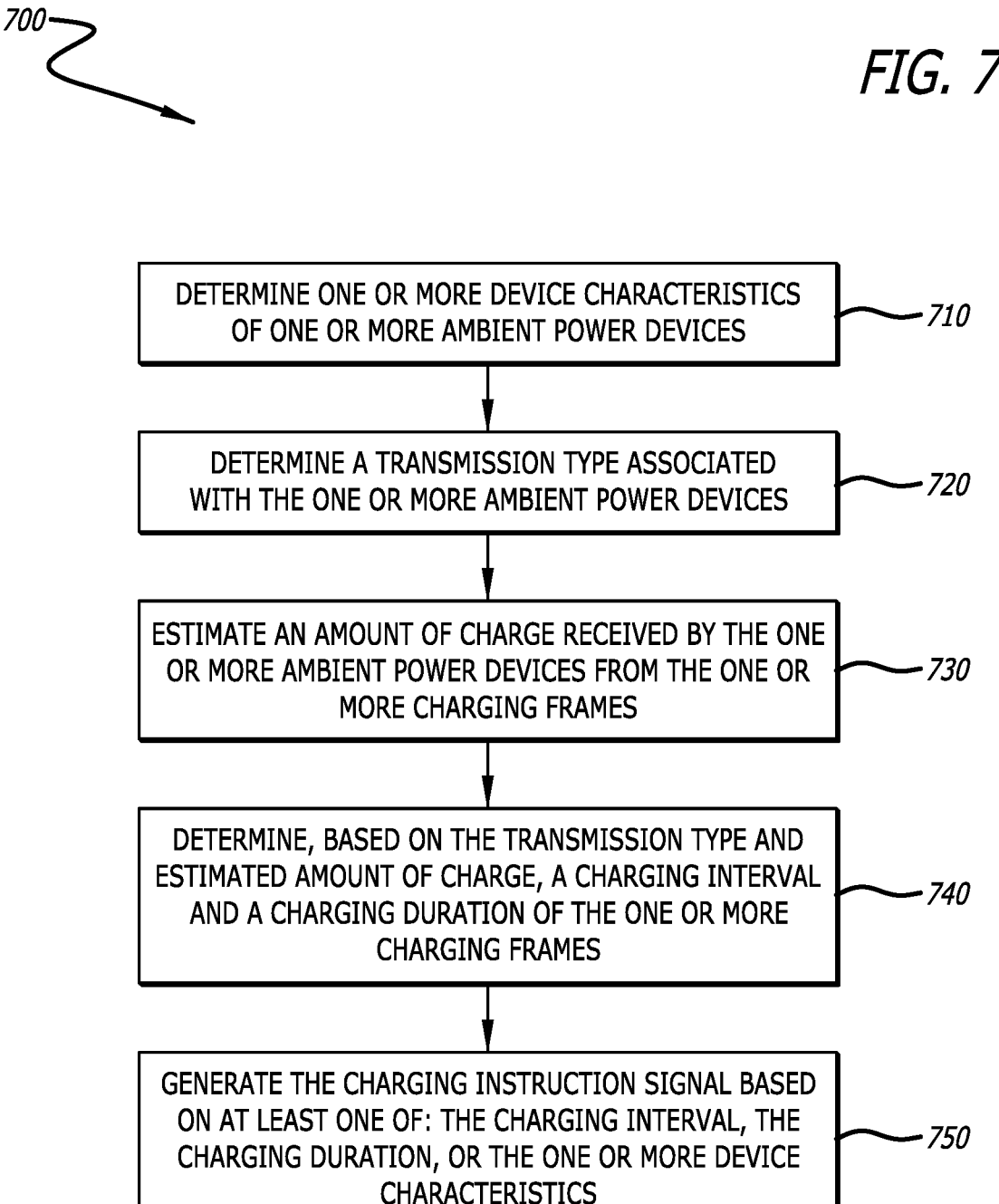

DETERMINE ONE OR MORE DEVICE CHARACTERISTICS OF ONE OR MORE AMBIENT POWER DEVICES — *710*

DETERMINE A TRANSMISSION TYPE ASSOCIATED WITH THE ONE OR MORE AMBIENT POWER DEVICES — *720*

ESTIMATE AN AMOUNT OF CHARGE RECEIVED BY THE ONE OR MORE AMBIENT POWER DEVICES FROM THE ONE OR MORE CHARGING FRAMES — *730*

DETERMINE, BASED ON THE TRANSMISSION TYPE AND ESTIMATED AMOUNT OF CHARGE, A CHARGING INTERVAL AND A CHARGING DURATION OF THE ONE OR MORE CHARGING FRAMES — *740*

GENERATE THE CHARGING INSTRUCTION SIGNAL BASED ON AT LEAST ONE OF: THE CHARGING INTERVAL, THE CHARGING DURATION, OR THE ONE OR MORE DEVICE CHARACTERISTICS — *750*

*800*

DETECT ONE OR MORE AMBIENT POWER DEVICES — *810*

DETERMINE ONE OR MORE DEVICE CHARACTERISTICS OF THE ONE OR MORE AMBIENT POWER DEVICES — *820*

GENERATE ONE OR MORE CHARGING FRAMES BASED ON THE ONE OR MORE DEVICE CHARACTERISTICS — *830*

TRANSMIT THE ONE OR MORE CHARGING FRAMES TO THE ONE OR MORE AMBIENT POWER DEVICES — *840*

SCHEDULING TRANSMISSIONS FROM AMBIENT POWER DEVICES

CROSS-REFERENCE TO RELATED APPLICATION

This application claims the benefit of U.S. Provisional Patent Application No. 63/615,717, filed Dec. 28, 2023, which is incorporated by reference herein in its entirety.

The present disclosure relates to wireless communication. More particularly, the present disclosure relates to communication with ambient power devices.

BACKGROUND

Ambient power devices can be of various types. Some ambient power devices may be passive devices that do not include batteries. Such passive devices merely reflect energy, such as Radio Frequency (RF) waves, received in real-time or in near-real time. Some other ambient power devices can be active devices that can include capacitors or batteries to store the energy. Such active devices can delay transmission of data by utilizing the stored energy. In a dynamic landscape of a large number of devices, a combination of active devices and passive devices may be utilized.

As a number of the ambient power devices increases in a network, many hurdles are faced in management of transmissions from the ambient power devices. In some conventional networks, the ambient power devices transmit data as soon as the capacitors or batteries reach a level of charge that is sufficient to transmit data. In such networks, the ambient power devices can autonomously transmit the data without needing any external device for coordination of transmissions. At small scales, such type of autonomous transmission may work in certain situations. However, as density of the ambient power devices in an area increases, such networks are more prone to collisions caused by simultaneous transmissions from multiple ambient power devices on same RF channel. This results in loss of the data transmitted by the ambient power devices and inefficient utilization of the RF channels in the network. When the collisions occur, the ambient power devices may re-accumulate the sufficient level of charge and then attempt to retransmit the data. This causes delays in transmission of the data. Hence, reliability and efficiency of the networks is adversely affected, thereby decreasing network throughput. As a result, such type of uncoordinated autonomous transmissions by the ambient power devices cannot be scaled to operate in larger networks.

Therefore, there is a need for a technique to effectively schedule the transmissions from the ambient power devices in the networks. There is also a need to effectively integrate the ambient power devices in existing wireless communication networks to facilitate coordination of the transmissions from the ambient power devices by existing wireless devices.

SUMMARY OF THE DISCLOSURE

Systems and methods for scheduling transmissions from multiple ambient power devices in accordance with embodiments of the disclosure are described herein. In some embodiments, a device includes a processor, and a memory communicatively coupled to the processor, wherein the memory includes a transmission scheduling logic. In some embodiments, a transmission scheduling logic is configured to determine one or more device characteristics of a plurality of ambient power devices, identify a set of overlapping ambient power devices of the plurality of ambient power devices in communication with a wireless device, and transmit, to the wireless device, a charging instruction signal based on the one or more device characteristics.

In some embodiments, the set of overlapping ambient power devices receive, from the wireless device, one or more charging frames based on the charging instruction signal.

In some embodiments, the transmission scheduling logic is further configured to receive one or more uplink frames from one or more ambient power devices of the plurality of ambient power devices.

In some embodiments, the one or more uplink frames are relayed from the one or more ambient power devices by the wireless device.

In some embodiments, the one or more device characteristics include at least one of an energy storage capacity of the one or more ambient power devices, a charging time associated with the energy storage capacity of the one or more ambient power devices, or a level of charge required by the one or more ambient power devices for transmitting the one or more uplink frames.

In some embodiments, the transmission scheduling logic is further configured to determine a transmission type associated with the one or more ambient power devices, and estimate an amount of charge received by the one or more ambient power devices from the one or more charging frames.

In some embodiments, the transmission scheduling logic is further configured to determine, based on the transmission type and estimated amount of charge, a charging interval and a charging duration of the one or more charging frames transmitted to the one or more ambient power devices.

In some embodiments, the charging instruction signal is generated based on at least one of the charging interval, the charging duration, or the one or more device characteristics.

In some embodiments, the one or more ambient power devices receive one or more downlink frames on a first channel and the one or more charging frames on a second channel.

In some embodiments, the transmission scheduling logic is further configured to determine a mean charging interval of the one or more charging frames.

In some embodiments, the transmission type is indicative of a type of the one or more uplink frames transmitted by the one or more ambient power devices.

In some embodiments, the transmission scheduling logic is further configured to transmit an authorization signal indicative of authorizing one ambient power device of the set of overlapping ambient power devices to transmit the one or more uplink frames at a time.

In some embodiments, the transmission scheduling logic is further configured to detect violation of the charging instruction signal by the wireless device, and generate an alarm signal upon detecting the violation of the charging instruction signal by the wireless device.

In some embodiments, the transmission scheduling logic is further configured to detect a change in position or state of the one or more ambient power devices.

In some embodiments, the transmission scheduling logic is further configured to update at least one of the set of overlapping ambient power devices, the charging interval, or the charging duration based on the change in position or state of the one or more ambient power devices.

In some embodiments, a transmission scheduling logic is configured to detect one or more ambient power devices, determine one or more device characteristics of the one or more ambient power devices, generate one or more charging frames based on the one or more device characteristics, and transmit the one or more charging frames to the one or more ambient power devices.

In some embodiments, the one or more device characteristics include at least one of an energy storage capacity of the one or more ambient power devices, a charging time associated with the energy storage capacity of the one or more ambient power devices, or a level of charge required by the one or more ambient power devices for transmitting one or more uplink frames.

In some embodiments, the transmission scheduling logic is further configured to determine a transmission type of the one or more uplink frames, estimate an amount of charge received by the one or more ambient power devices from the one or more charging frames, and determine an interval and a duration of the one or more charging frames based on corresponding transmission type and estimated amount of charge.

In some embodiments, a method includes determining one or more device characteristics of a plurality of ambient power devices, identifying a set of overlapping ambient power devices of the plurality of ambient power devices in communication with a wireless device, and transmitting, to the wireless device, a charging instruction signal based on the one or more device characteristics.

In some embodiments, the one or more device characteristics include at least one of an energy storage capacity of the plurality of ambient power devices, a charging time associated with the energy storage capacity of the plurality of ambient power devices, or a level of charge required by the plurality of ambient power devices for transmitting one or more uplink frames.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

FIG. 5 is a flowchart depicting a process for receiving one or more uplink frames, in accordance with various embodiments of the disclosure;

FIG. 6 is a flowchart depicting a process for relaying one or more uplink frames, in accordance with various embodiments of the disclosure;

FIG. 7 is a flowchart depicting a process for generating a charging instruction signal, in accordance with various embodiments of the disclosure;

Figure 1:
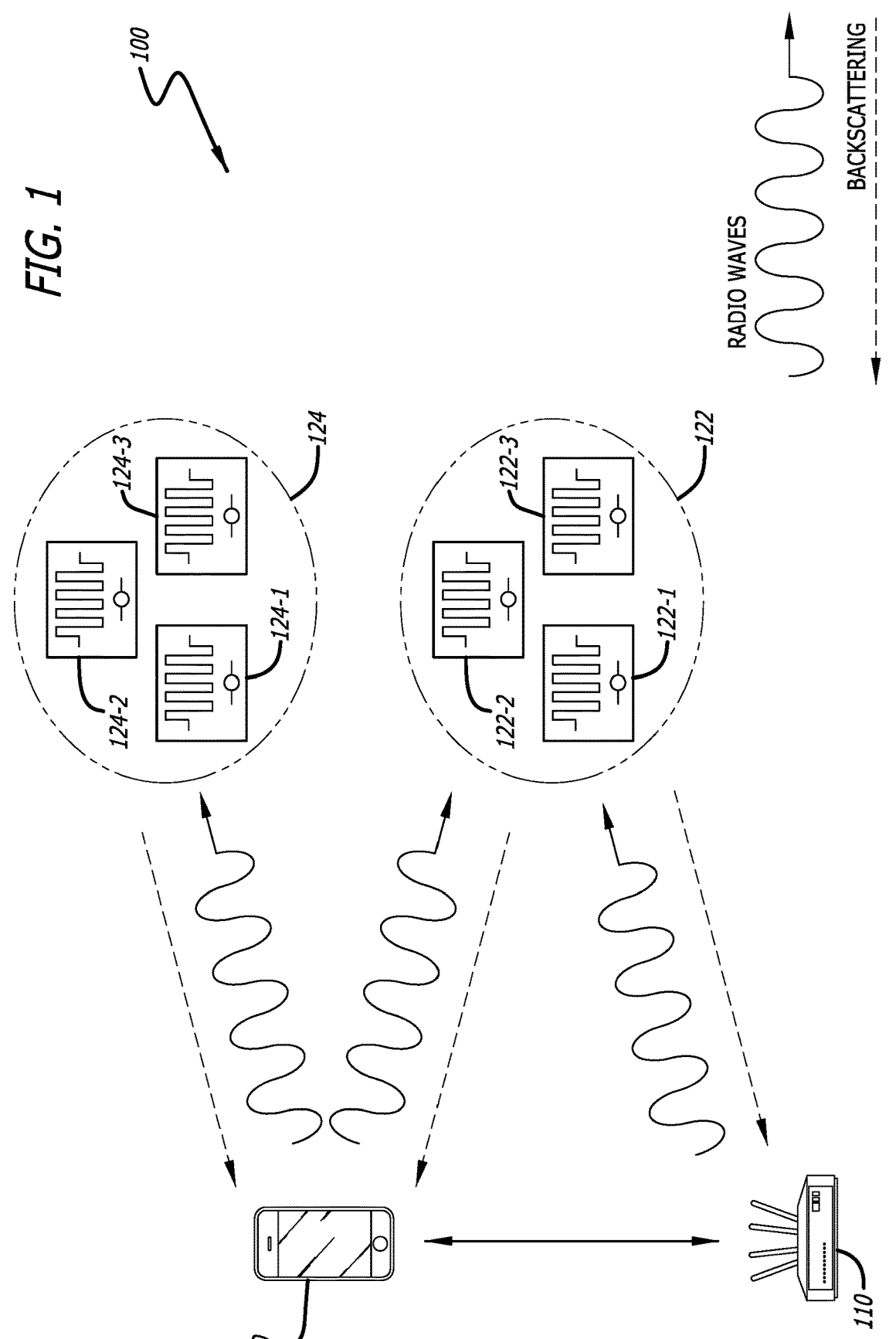
FIG. 1 is a conceptual illustration of a wireless communication network, in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that schedule transmissions from multiple ambient power devices. A communication network may comprise an Access Point (AP) and one or more ambient power devices. The ambient power devices can be in communication with the AP by way of one or more Radio Frequency (RF) channels. The RF channels may include multiple bands of frequencies. In some embodiments, for example, the bands of frequencies may include Wi-Fi bands such as but not limited to 2.4 GHZ, 5 GHz, or 6 GHz. Some more examples can include millimeter-wave (mmWave) bands. Additional examples can include Sub-1 GHz band frequencies. The ambient power devices can be powered by one or more energy sources such as, but not limited to, radio waves, light, motion, heat, or any such ambient energy sources.

In many embodiments, the AP can determine one or more device characteristics of the ambient power devices. In some embodiments, the ambient power devices can share the device characteristics with the AP. In certain embodiments, for example, the ambient power devices may share the device characteristics at the time of association with the AP. In more embodiments, for example, the ambient power devices can share the device characteristics with the AP periodically, i.e., at predetermined time intervals. In some more embodiments, the device characteristics may include, but are not limited to, transmission characteristics, charging characteristics, or identification characteristics. In numerous embodiments, examples of the transmission characteristics may include but are not limited to information about types of frames, for e.g., keepalive frames, scheduled updates, or triggered alarms, etc. In many more embodiments, the transmission characteristics can include information about transmission, for e.g., transmission type, frame sizes, or transmission intervals, etc. In still more embodiments, examples of the charging characteristics may include, but are not limited to, power requirements of the ambient power devices, i.e., a level of charge required by the ambient power devices to transmit one or more frames, an energy storage capacity of the ambient power devices, charging time for accumulating the energy storage capacity of the ambient power devices, or energy harvesting capacities of the ambient power devices etc. In many further embodiments, the device characteristics may include the identification characteristics, such as but not limited to, device identifiers of the ambient power devices or addresses of the ambient power devices, etc.

In a number of embodiments, the ambient power devices can share the device characteristics with the AP by way of a Manufacturer Usage Description (MUD) Uniform Resource Locator (URL). The ambient power devices may signal to the AP types of accesses and network functionalities required by the ambient power devices to function. In some embodiments, the ambient power devices can transmit MUD data or a MUD profile to the AP. In certain embodiments, the ambient power devices and/or the AP may utilize one or more protocols, such as but not limited to Link Local Discovery Protocol (LLDP), X.509 or Dynamic Host Configuration Protocol (DHCP) etc. to communicate the MUD URL, for example. In more embodiments, the AP can retrieve a transmission topology of an ambient power device from corresponding MUD URL. In some more embodiments, the ambient power device may share the MUD URL with the AP at the time of association with the AP.

In various embodiments, the AP can determine, based on the device characteristics of the ambient power devices, a charging interval and a charging duration for one or more charging frames. To determine the charging interval and the charging duration, the AP may determine a transmission type associated with the ambient power devices. In some embodiments, the transmission type can be indicative of one or more types of uplink frames transmitted by the ambient power devices. The transmission type may also be indicative of duration, length, periodicity, or other such parameters associated with the uplink frames. The AP may further estimate an amount of charge received by the ambient power devices from the charging frames. In more embodiments, the amount of charge received by each ambient power device from a charging frame may vary according to the corresponding energy storage capacity of the ambient power device. In some more embodiments, the AP can estimate a number of charging frames required for charging the ambient power devices to a predetermined level of charge required for transmission of the uplink frames. The predetermined level of charge required for transmission of the uplink frames may vary according to a number of uplink frames transmitted by the ambient power devices in a Transmission Opportunity (TXOP). The AP can determine the charging interval and the charging duration of the charging frames based on one or more of: the device characteristics, the transmission types, and the estimated amounts charge associated with the ambient power devices. The AP may transmit the charging frames to the ambient power devices. In more embodiments, the charging duration may correspond to the length of the charging frame and the charging interval may correspond to a time gap between the charging frames. In some embodiments, the charging interval and charging duration may be different for different ambient power devices. In certain embodiments, the charging interval and the charging duration can be different for different sets of ambient power devices. The AP can determine an optimum charging interval, charging duration, and/ or the number of the charging frames to be transmitted to the ambient power devices to minimize a duty cycle consumed by the charging frames and also to ensure that the ambient power devices retain a sufficient amount of charge required for transmission of the uplink frames.

In some embodiments, the AP may dynamically optimize the charging interval, charging duration, and/or the number of the charging frames based on one or more changes in network topology, changes in topology of the ambient power devices, or changes in network conditions. In some more embodiments, the AP can also dynamically optimize the charging interval, charging duration, and/or the number of the charging frames by utilizing Machine Learning (ML) techniques. In numerous embodiments, the AP may transmit the charging frames to the ambient power devices. In many further embodiments, the AP can generate a charging instruction signal based on one or more of: the charging interval, the charging duration, or the device characteristics of the ambient power devices.

In many additional embodiments, the AP may transmit the charging instruction signal to a wireless device. The wireless device can function as a relay between the AP and the ambient power devices. The wireless device may transmit the charging frames to the ambient power devices based on the charging instruction signal. In some embodiments, the AP can determine one or more wireless devices that can function as the relay between the AP and the ambient power devices. In that, the AP may initially identify all wireless devices in communication with the ambient power devices. The AP can also identify the ambient power devices that can be in communication with the wireless devices. The AP may assign different wireless devices as relays for different sets of ambient power devices. The wireless devices can receive the uplink frames from the ambient power devices and can further relay the uplink frames to the AP.

In additional embodiments, the AP may determine one or more overlapping sets of ambient power devices. In some embodiments, a set of ambient power devices is overlapping if all the ambient power devices in the set are in communication, i.e., can be heard by same wireless device or the AP, otherwise, the ambient power devices are non-overlapping. In certain embodiments, the set of overlapping ambient power devices may indicate that the ambient power devices share a common communication resource, such as the wireless device or the AP. Therefore, in the set of overlapping ambient power devices, one ambient power device may be allowed to transmit the uplink frames to the wireless device or the AP on one RF channel at a time.

Conversely, in more embodiments, the set of non-overlapping ambient power devices may indicate that the ambient power devices are in communication with multiple communication resources, and hence, can function independently of each other. Therefore, two or more ambient power devices in non-overlapping sets may be allowed to transmit the uplink frames at same time. In numerous embodiments, the AP can categorize a plurality of ambient power devices into multiple overlapping and/or non-overlapping sets of ambient power devices. In some more embodiments, positions or states of the ambient power devices may change, for example, the ambient power devices can be switched on or off or switched to a power saving state. In more embodiments, a topology of the ambient power devices can change due to changes in positions of the ambient power devices. In still more embodiments, positions of the wireless devices may change. In such cases, the AP can reorganize the ambient power devices in the overlapping and non-overlapping sets based on updated positions or states. The AP may also update the charging intervals and/or the charging durations based on the updated positions or states of the ambient power devices and wireless devices.

In further embodiments, the AP and/or the wireless device can transmit the charging frames to the multiple overlapping and non-overlapping sets of ambient power devices. The AP may transmit the charging frames periodically or at quasi-static intervals. By transmitting the charging frames periodically, the ambient power devices can rely on availability of the charging frames to charge the batteries or the capacitors in the ambient power devices. By transmitting the charging frames at quasi-static intervals, the AP can ensure that the ambient power devices remain sufficiently charged to maintain uninterrupted communication. In some embodiments, the AP may maintain a record of the charging frames transmitted to the ambient power devices. The AP can further determine charging profiles for the ambient power devices based on the record of the charging frames. The AP may determine mean charging intervals for the sets of ambient power devices based on the record of the charging frames. Based on the mean charging intervals and/or the charging profiles of the ambient power devices, the AP can determine one or more energy management strategies for the ambient power devices by utilizing the ML techniques.

In many more embodiments, the AP may perform off-channel charging for the ambient power devices. In that, the AP can transmit the charging frames on one RF channel and downlink frames on a different RF channel. In that, the ambient power devices may receive the charging frames and the downlink frames on separate RF channels. By utilizing the off-channel charging, the ambient power devices can be charged without interrupting the reception of data by the ambient power devices. In some embodiments, the AP can determine one or more optimum RF channels for charging the devices and one or more optimum RF channels for transmitting the downlink frames. In cases where, for the ambient power device, the best RF channel for charging is not the same as the one or more RF channels available for reception of the downlink frames, the AP can perform the off-channel charging for the ambient power device. The off-channel charging can be achieved by reserving a bandwidth for charging and downlink communication. The AP may reserve the bandwidth by Clear-to-Send-to-Self (CTS2Self) frames or Multi-User Request-to-Send (MU-RTS) frames. In the case of duplicated CTS2Self frames, the AP can transmit multiple CTS2Self frames, each indicating the reservation of the bandwidth for both: the downlink communication and the charging. In the case of MU-RTS frames, the AP can allocate Resource Units (RUs) within the bandwidth to indicate that the RUs are designated for charging or for downlink communication. The AP may allocate RUs exclusively for charging, thereby facilitating uninterrupted communication with the ambient power devices.

In many additional embodiments, the AP can detect violation, by the relay or the wireless device, of charging instructions indicated by the charging instruction signal. If the AP detects the violation of the charging instructions, the AP may generate an alarm signal. The alarm signal can be provided to an operator or displayed on a device. In some embodiments, the violation of charging instructions may occur, for example, if the wireless device transmits the charging frames to the ambient power devices incorrectly or if the wireless device fails to transmit the charging frames. In some more embodiments, the violation of charging instructions may occur if the charging frames are transmitted by the wireless device for incorrect duration or at incorrect time. The violation of the charging instructions may also occur if the ambient power devices are not sufficiently charged to enable transmission of the uplink frames.

Advantageously, the transmission scheduling technique of the present disclosure can facilitate implementation of the energy management strategies. The transmission scheduling technique is scalable, and hence, can be implemented for a large number of ambient power devices. The transmission scheduling technique also facilitates integration of the ambient power devices in existing wireless networks. The AP can ensure uninterrupted connectivity with the ambient power devices by maintaining sufficient charge in the ambient power devices for uplink communication, by assigning and updating the overlapping and non-overlapping sets of ambient power devices, and by implementing off-channel charging. By utilizing these techniques, the AP can optimize use of radio resources and reduce collisions.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system.". Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C.". An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a conceptual illustration of a wireless communication network 100, in accordance with various embodiments of the disclosure is shown. In many embodiments, the wireless communication network 100 may include an Access Point (AP) 110, a first set of ambient power devices 122 comprising first through third ambient power devices 122-1, 122-2, and 122-3, a second set of ambient power devices 124 comprising fourth through sixth ambient power devices 124-1, 124-2, and 124-3, and a wireless device 130. The ambient power devices 122-124 may be powered by one or more energy sources such as, but not limited to, radio waves, light, motion, heat, or any such ambient energy sources. The ambient power devices 122-124 may be active devices, i.e., with energy storage capacity such as a battery or a capacitor etc. or passive devices. The ambient power devices 122-124 can receive one or more Radio Frequency (RF) signals. The ambient power devices 122-124 may backscatter the RF signals. In some embodiments, the ambient power devices 122-124 can modulate and backscatter incident RF signals. In certain embodiments, the ambient power devices 122-124 can be in communication with the AP 110 by utilizing Wi-Fi bands such as but not limited to 2.4 GHz, 5 GHZ, or 6 GHZ. Some more examples can include millimeter-wave (mmWave) bands. Additional examples can include Sub-1 GHz band frequencies. Examples of the backscatter communication between the ambient power devices 122-124, the AP 110, and the wireless device 130 include but are not limited to monostatic backscatter, bistatic backscatter, and ambient backscatter. The wireless device 130 may function as a receiver for backscatter transmission from the ambient power devices 122-124. Examples of the wireless device 130 include but are not limited to smartphone, tablet, computer, an RF Identification (RFID) tag reader, etc. In certain embodiments, for example, the ambient power devices 122-124 may be associated with a consumer electronic device or an Internet of Things (IoT) enabled device.

In a number of embodiments, the ambient power devices 122-124 can share device characteristics with the AP 110. In some embodiments, the device characteristics may include, but are not limited to, transmission characteristics, charging characteristics, or identification characteristics. In certain embodiments, for example, the ambient power devices 122-124 may share the device characteristics at the time of association with the AP 110. In more embodiments, for example, the ambient power devices 122-124 can share the device characteristics with the AP 110 periodically, i.e., at predetermined time intervals. The ambient power devices 122-124 can share the device characteristics with the AP 110 by way of a Manufacturer Usage Description (MUD) Uniform Resource Locator (URL). The ambient power devices 122-124 may signal to the AP 110 types of accesses and network functionalities required by the ambient power devices 122-124 to function. In some embodiments, the ambient power devices 122-124 can transmit MUD data or a MUD profile to the AP 110. In certain embodiments, the ambient power devices 122-124 and/or the AP 110 may utilize one or more protocols, such as but not limited to Link Local Discovery Protocol (LLDP), X.509 or Dynamic Host Configuration Protocol (DHCP) etc. to communicate the MUD URL, for example. In more embodiments, the AP 110 can retrieve a transmission topology of the ambient power devices 122-124 from corresponding MUD URL. In some more embodiments, the ambient power devices 122-124 may share the MUD URL with the AP 110 at the time of association with the AP 110.

In various embodiments, the AP 110 may determine one or more overlapping sets of the ambient power devices 122-124. The fourth through sixth ambient power devices 124-1, 124-2, and 124-3 are in communication, i.e., can be heard by the same wireless device 130, and hence, the second set of ambient power devices 124 are overlapping. The AP 110 may allow only one of the fourth through sixth ambient power devices 124-1, 124-2, and 124-3 to transmit uplink frames to the wireless device 130 on an RF channel at a time. The first through third ambient power devices 122-1, 122-2, and 122-3 are in communication with the wireless device 130 and the AP 110, and hence, the first set of ambient power devices 122 are non-overlapping. The first through third ambient power devices 122-1, 122-2, and 122-3 can independently transmit the uplink frames.

In additional embodiments, the AP 110 can transmit the charging frames to the first set of ambient power devices 122. The AP 110 may receive the uplink frames transmitted by the first set of ambient power devices 122. The AP 110 may further generate a charging instruction signal and transmit the charging instruction signal to the wireless device 130. The wireless device 130 may transmit the charging frames to the second set of ambient power devices 124 based on the charging instruction signal. The wireless device 130 can receive the uplink frames transmitted by the second set of ambient power devices 124 and relay the uplink frames to the AP 110.

Although a specific embodiment for the wireless communication network 100 for carrying out the various steps, processes, methods, and operations described herein is discussed with respect to FIG. 1, any of a variety of systems and/or processes may be utilized in accordance with embodiments of the disclosure. For example, the AP 110 may dynamically organize the sets of overlapping and non-overlapping ambient power devices. The elements depicted in FIG. 1 may also be interchangeable with other elements of FIGS. 2-9 as required to realize a particularly desired embodiment.

Figure 2:
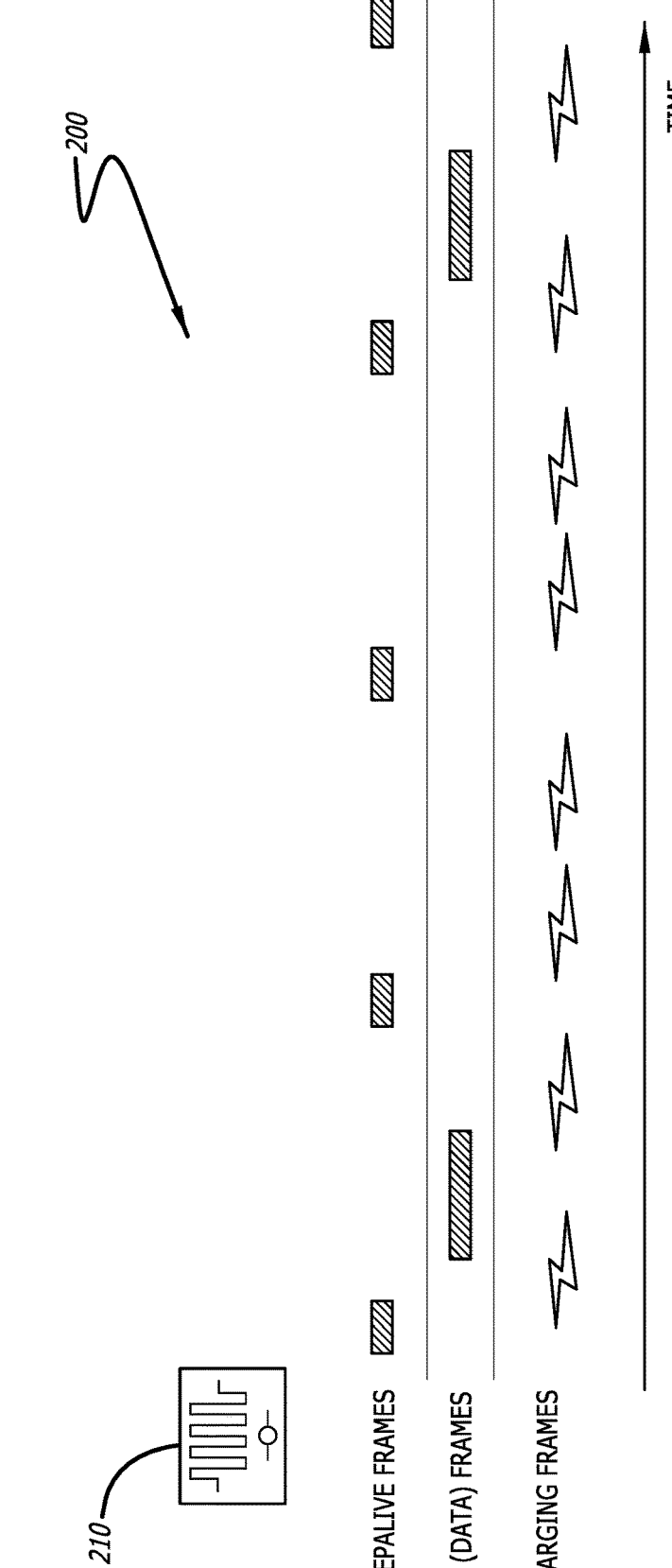
FIG. 2 is a conceptual illustration of transmission of one or more frames in a wireless communication network, in accordance with various embodiments of the disclosure.

Referring to FIG. 2, a conceptual illustration of transmission of frames in a wireless communication network 200, in accordance with various embodiments of the disclosure is shown. In many embodiments, the wireless communication network 200 may include an ambient power device 210. The ambient power device 210 may receive one or more keepalive frames from the AP on a first RF channel. The ambient power device 210 may further transmit the uplink frames to the AP on a second RF channel. The uplink frames can include data, such as but not limited to, measured values of one or more physical quantities. In some embodiments, for example, the ambient power device 210 may be a pressure sensor, temperature sensor, or humidity sensor, and the uplink frames can be indicative of pressure value, temperature value, or humidity value measured by the ambient power device 210 respectively. The ambient power device 210 can further receive the charging frames from the AP on a third RF channel. The ambient power device 210 can charge the battery or the capacitor based on the charging frames.

Although a specific embodiment for the transmission of frames in the wireless communication network 200 for carrying out the various steps, processes, methods, and operations described herein is discussed with respect to FIG. 2, any of a variety of systems and/or processes may be utilized in accordance with embodiments of the disclosure.

For example, the AP can perform off-channel charging wherein the charging frames and one or more downlink frames are transmitted by the AP on separate RF channels. The elements depicted in FIG. 2 may also be interchangeable with other elements of FIG. 1 and FIGS. 3-9 as required to realize a particularly desired embodiment.

Figure 3:
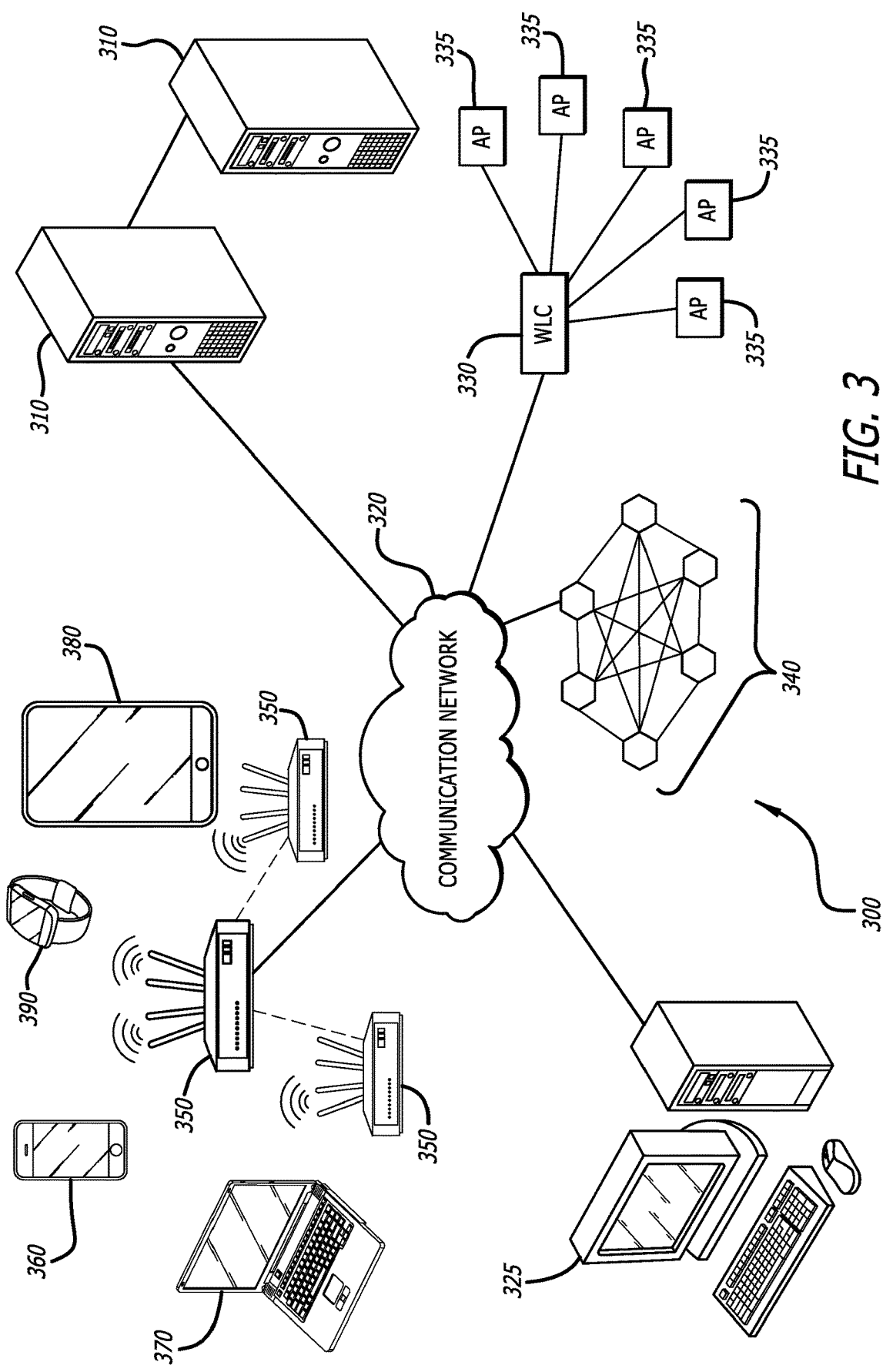
FIG. 3 is a conceptual network diagram of various environments that a transmission scheduler may operate on a plurality of network devices, in accordance with various embodiments of the disclosure.

Referring to FIG. 3, a conceptual network diagram 300 of various environments that a transmission scheduler may operate on a plurality of network devices, in accordance with various embodiments of the disclosure is shown. Those skilled in the art will recognize that the transmission scheduler can be comprised of various hardware and/or software deployments and can be configured in a variety of ways. In many embodiments, the transmission scheduler can be configured as a standalone device, exist as a logic in another network device, be distributed among various network devices operating in tandem, or remotely operated as part of a cloud-based network management tool. In further embodiments, one or more servers 310 can be configured with or otherwise operate the transmission scheduler. In many embodiments, the transmission scheduler may operate on one or more servers 310 connected to a communication network 320. The communication network 320 can include wired networks or wireless networks. In many embodiments, the communication network 320 may be a Wi-Fi network operating on various frequency bands, such as, 2.4 GHz, 5 GHZ, or 6 GHz. In further embodiments, the transmission scheduler operating on the servers 310 can facilitate in scheduling transmissions from one or more ambient power devices. The transmission scheduler can be provided as a cloud-based service that can service remote networks, such as, but not limited to a deployed network 340. In many embodiments, the transmission scheduler can be a logic that coordinates with the one or more wireless devices to facilitate charging the ambient power devices.

However, in additional embodiments, the transmission scheduler may be operated as a distributed logic across multiple network devices. In the embodiment depicted in FIG. 3, a plurality of APs 350 can operate as the transmission scheduler in a distributed manner or may have one specific device operate as the transmission scheduler for all of the neighboring or sibling APs 350. The APs 350 facilitate Wi-Fi connections for various electronic devices, such as but not limited to mobile computing devices including laptop computers 370, cellular phones 360, portable tablet computers 380 and wearable computing devices 390.

In further embodiments, the transmission scheduler may be integrated within another network device. In the embodiment depicted in FIG. 3, a wireless LAN controller (WLC) 330 may have an integrated transmission scheduler that the WLC 330 can use to manage the uplink transmissions within the various APs 335 that the WLC 330 is connected to, either wired or wirelessly. In still more embodiments, a personal computer 325 may be utilized to access and/or manage various aspects of the transmission scheduler, either remotely or within the network itself. In the embodiment depicted in FIG. 3, the personal computer 325 communicates over the communication network 320 and can access the transmission scheduler of the servers 310, or the network APs 350, or the WLC 330.

Although a specific embodiment for various environments that the transmission scheduler may operate on a plurality of network devices suitable for carrying out the various steps, processes, methods, and operations described herein is discussed with respect to FIG. 3, any of a variety of systems and/or processes may be utilized in accordance with embodiments of the disclosure. In many non-limiting examples, the transmission scheduler may be provided as a device or software separate from the network devices or the transmission scheduler may be integrated into the network devices. The elements depicted in FIG. 3 may also be interchangeable with other elements of FIGS. 1-2 and 4-9 as required to realize a particularly desired embodiment.

Figure 4:
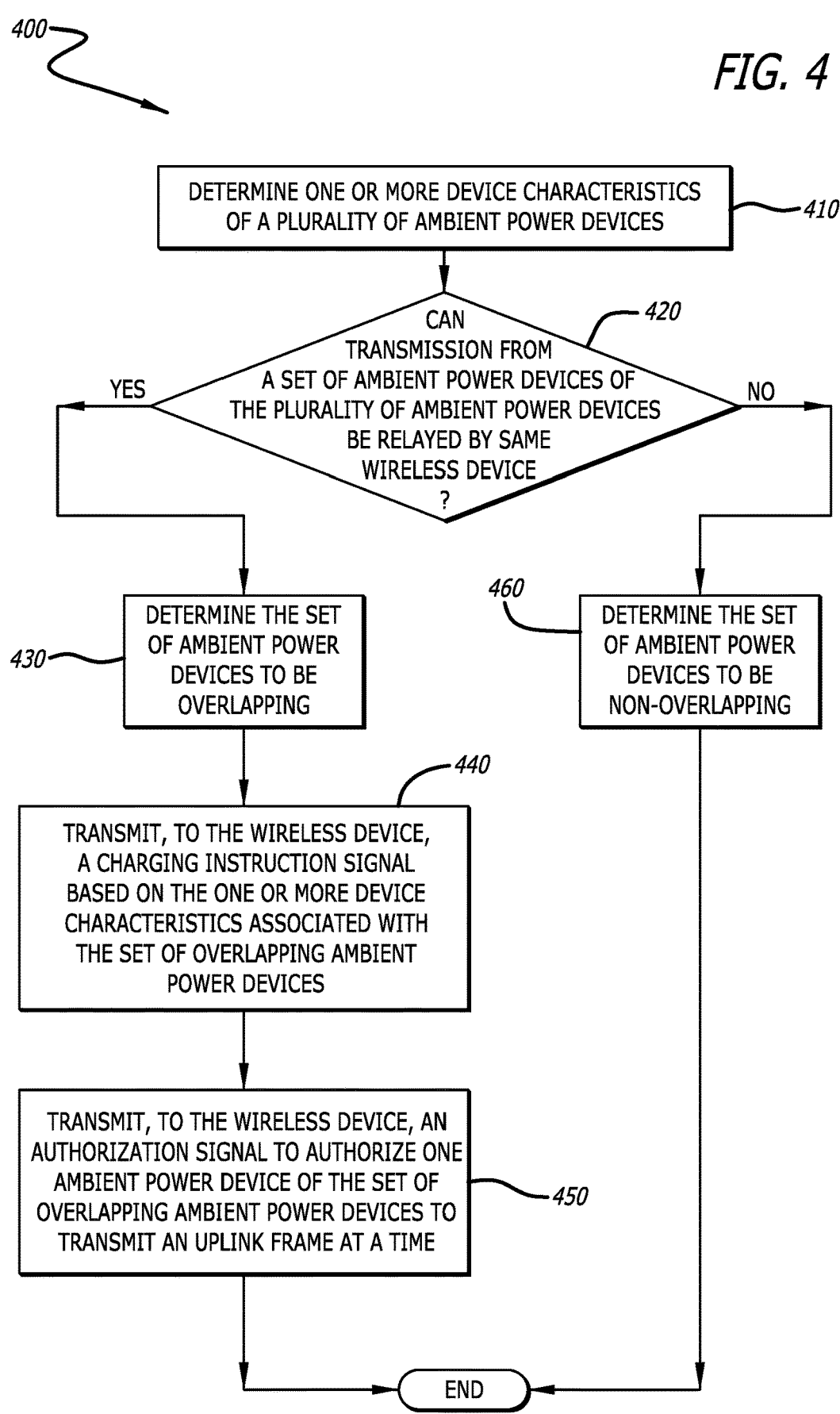
FIG. 4 is a flowchart depicting a process for determining one or more overlapping ambient power devices, in accordance with various embodiments of the disclosure.

Referring now to FIG. 4, a flowchart depicting a process 400 for determining the overlapping ambient power devices, in accordance with various embodiments of the disclosure is shown. In many embodiments, the process 400 may determine the device characteristics of a plurality of ambient power devices (block 410). In some embodiments, the process 400 can be implemented by the AP. In certain embodiments, process 400 can receive the device characteristics from the ambient power devices at the time of association of the ambient power devices with the AP. In more embodiments, for example, the process 400 can receive the device characteristics from the ambient power devices periodically. In some more embodiments, the device characteristics may include, but are not limited to, transmission characteristics, charging characteristics, or identification characteristics. In numerous embodiments, examples of the transmission characteristics may include but are not limited to information about types of frames, for e.g., keepalive frames, scheduled updates, or triggered alarms, etc. In many more embodiments, the device characteristics can include information about transmission, for e.g., transmission type, frame sizes, or transmission intervals, etc. In still more embodiments, examples of the charging characteristics may include, but are not limited to, power requirements of the ambient power devices, i.e., a level of charge required by the ambient power devices to transmit one or more frames, the energy storage capacity of the ambient power devices, charging time for accumulating the energy storage capacity of the ambient power devices, or energy harvesting capacities of the ambient power devices etc. In many further embodiments, the device characteristics may include the identification characteristics, such as but not limited to, device identifiers of the ambient power devices or addresses of the ambient power devices, etc. In still more embodiments, the process 400 can retrieve the topology of the ambient power devices based on the device characteristics.

In a number of embodiments, the process 400 can determine whether a set of ambient power devices of the plurality of ambient power devices can be relayed by same wireless device (block 420). In some embodiments, the process 400 may determine the ambient power devices that share the same communication resource as overlapping. In certain embodiments, the process 400 can determine the ambient power devices that are connected to multiple communication resources as non-overlapping.

If at block 420, the process 400 determines that the set of ambient power devices are in communication with the same wireless device, in various embodiments, the process 400 can determine that the set of ambient power devices are overlapping (block 430). In some embodiments, the set of overlapping ambient power devices can be heard by the same AP. In certain embodiments, the transmissions from the set of overlapping ambient power devices may be scheduled by the process 400 to avoid collisions.

In additional embodiments, the process 400 can transmit the charging instruction signal to the wireless device (block 440). In some embodiments, the process 400 may generate the charging instruction signal based on the device characteristics of the ambient power devices. In certain embodiments, the charging instruction signal can be indicative of a charging duration and a charging interval for transmitting the charging frames to the ambient power devices. In more embodiments, the wireless device may transmit the charging frames to the ambient power devices based on the charging instruction signal.

In further embodiments, the process 400 may transmit an authorization signal to the wireless device (block 450). In some embodiments, the authorization signal may be indicative of allowing transmission of the uplink frames from one ambient power device of the set of overlapping ambient power devices at a time. In certain embodiments, the process 400 may schedule transmissions of the uplink frames from two or more overlapping ambient power devices at different times to avoid collisions. In more embodiments, the process 400 can allocate distinct time slots to the overlapping ambient power devices for uplink transmissions to avoid collisions of the uplink frames.

If at block 420, the process 400 determines that the set of ambient power devices are in communication with multiple wireless devices, in many more embodiments, the process 400 can determine that the set of ambient power devices are non-overlapping (block 460). In some embodiments, the set of non-overlapping ambient power devices can function independently. In certain embodiments, the process 400 can authorize simultaneous uplink transmission by two or more non-overlapping ambient power devices.

Although a specific embodiment for the process 400 for determining the overlapping ambient power devices for carrying out the various steps, processes, methods, and operations described herein is discussed with respect to FIG. 4, any of a variety of systems and/or processes may be utilized in accordance with embodiments of the disclosure. For example, the process 400 may schedule transmissions of the uplink frames from the overlapping ambient power devices to avoid collisions. The elements depicted in FIG. 4 may also be interchangeable with other elements of FIGS. 1-3 and FIGS. 5-9 as required to realize a particularly desired embodiment.

Referring now to FIG. 5, a flowchart depicting a process 500 for receiving the uplink frames, in accordance with various embodiments of the disclosure is shown. In many embodiments, the process 500 can transmit the charging instruction signal to the wireless device (block 510). In some embodiments, the process 500 may be implemented by the AP. In certain embodiments, the charging instruction signal can be indicative of the charging interval and/or the charging duration of the charging frames. In more embodiments, the process 500 can generate the charging instruction signal based on one or more of: the charging interval, the charging duration, or the device characteristics of the ambient power devices.

In a number of embodiments, the set of overlapping ambient power devices may receive the charging frames from the wireless device (block 520). In some embodiments, the charging frames can be transmitted to the set of overlapping ambient power devices by the wireless device based on the charging instruction signal received from the AP. In certain embodiments, the charging frames can be transmitted by the AP. In more embodiments, the ambient power devices can charge the batteries or capacitors based on the received charging frames.

In various embodiments, the process 500 may receive the uplink frame from the wireless device (block 530). In some embodiments, the uplink frames can be transmitted to the wireless device by the overlapping ambient power devices. In certain embodiments, the wireless device may relay the received uplink frames to the AP.

In additional embodiments, the process 500 can detect the violation of the charging instructions by the wireless device (block 540). In some embodiments, the violation of charging instructions may occur, for example, if the wireless device transmits the charging frames to the ambient power devices incorrectly or if the wireless device fails to transmit the charging frames. In some more embodiments, the violation of charging instructions may occur if the charging frames are transmitted by the wireless device for incorrect duration or at incorrect time. The violation of the charging instructions may also occur if the ambient power devices are not sufficiently charged to enable transmission of the uplink frames.

If at block 540, the process 500 determines that the wireless device has not violated the charging instructions, in further embodiments, the process 500 can check if the uplink frames from all the overlapping ambient power devices have been received (block 550). In some embodiments, the process 500 may associate each received uplink frame with one of the overlapping ambient power devices. Thereafter, in certain embodiments, the process 500 can determine which of the overlapping ambient power devices have not yet transmitted the uplink frames. In more embodiments, the process 500 may check for the received uplink frames in real-time or near-real time. In some more embodiments, the process 500 can check for the uplink frames that are scheduled to be relayed by the wireless device.

If at block 550, the process 500 determines that the uplink frames from all the overlapping ambient power devices have not been received, the process 500 can loop back to block 530 to receive the next uplink frame. In some embodiments, the process 500 may continuously listen for the next uplink frames. In certain embodiments, the process 500 can ensure that the AP is responsive to incoming uplink frames and does not miss any uplink transmission from any ambient power device.

If at block 540, the process 500 determines that the wireless device has violated the charging instructions, in further embodiments, the process 500 can generate the alarm signal indicative of the violation of the charging instructions (block 560). In some embodiments, the alarm signal can be provided to an operator. In certain embodiments, the alarm signal can be displayed on a device or a controller. In more embodiments, the alarm signal can be an audio-visual signal.

Although a specific embodiment for the process 500 for receiving the uplink frames for carrying out the various steps, processes, methods, and operations described herein is discussed with respect to FIG. 5, any of a variety of systems and/or processes may be utilized in accordance with embodiments of the disclosure. For example, the process 500 may dynamically monitor and schedule the uplink transmissions from the overlapping ambient power devices. The elements depicted in FIG. 5 may also be interchangeable with other elements of FIGS. 1-4 and FIGS. 6-9 as required to realize a particularly desired embodiment.

Referring now to FIG. 6, a flowchart depicting a process 600 for relaying the uplink frames, in accordance with various embodiments of the disclosure is shown. In many embodiments, the process 600 can receive the charging instruction signal (block 610). In some embodiments, the process 600 may be implemented by the wireless device in communication with the set of overlapping ambient power devices. In certain embodiments, the charging instruction signal can be indicative of the charging duration or the charging interval of the charging frames. In more embodiments, the charging instruction signal can be indicative of the number of charging frames to be transmitted to the set of overlapping ambient power devices.

In a number of embodiments, the process 600 can determine the ambient power devices associated with the charging instruction signal (block 620). In some embodiments, the process 600 can receive a separate charging instruction signal for each set of ambient power devices. In certain embodiments, the process 600 may identify the set of ambient power devices to be overlapping based on the charging instruction signal. In more embodiments, the charging instruction signal can comprise one or more device identifiers associated with the one or more ambient power devices in the set of ambient power devices.

In various embodiments, the process 600 may select one ambient power device (block 630). In some embodiments, the process 600 can further identify the RF channels for transmitting the charging frames associated with the ambient power device. In certain embodiments, the process 600 may utilize different RF channels for transmitting the charging frames to different ambient power devices based on the charging instruction signal.

In additional embodiments, the process 600 can transmit the charging frames to the ambient power device (block 640). In some embodiments, the ambient power device can utilize the charging frame to charge the capacitor or battery in the ambient power device. In certain embodiments, the process 600 may utilize the off-channel charging to transmit the charging frames and the downlink frames on separate RF channels simultaneously.

In further embodiments, the process 600 may check whether all the ambient power devices have been selected (block 645). In some embodiments, the process 600 can transmit the charging frames to the ambient power devices sequentially. In certain embodiments, the process 600 may monitor whether all the ambient power devices of the set of overlapping ambient power devices have received the charging frames.

If at block 645, the process 600 determines that all the ambient power devices have not been selected, in many embodiments, the process 600 can loop back to block 630. If at block 645, the process 600 determines that all the ambient power devices have been selected, in further embodiments, the process 600 can check if the uplink frame from the ambient power device has been received (block 655). In some embodiments, the process 600 may associate each received uplink frame with one of the overlapping ambient power devices. Thereafter, in certain embodiments, the process 600 can determine which of the overlapping ambient power devices have not yet transmitted the uplink frames. In more embodiments, the process 600 may check for the received uplink frames in real-time or near-real time.

If at block 655, the process 600 determines that the uplink frame has been received, in many more embodiments, the process 600 can relay the received uplink frame (block 660). In some embodiments, the process 600 may transmit the received uplink frame to the AP. Thereafter, the process 600 can loop back to block 655 to check for the next uplink frames. In certain embodiments, the process 600 can receive the uplink frames from each ambient power device of the set of overlapping ambient power devices sequentially.

Although a specific embodiment for the process 600 for relaying the uplink frames for carrying out the various steps, processes, methods, and operations described herein is discussed with respect to FIG. 6, any of a variety of systems and/or processes may be utilized in accordance with embodiments of the disclosure. For example, the process 600 may dynamically receive and relay the uplink frames in real-time or near-real time. The elements depicted in FIG. 6 may also be interchangeable with other elements of FIGS. 1-5 and FIGS. 7-9 as required to realize a particularly desired embodiment.

Referring now to FIG. 7, a flowchart depicting a process 700 for generating the charging instruction signal, in accordance with various embodiments of the disclosure is shown. In many embodiments, the process 700 can determine the device characteristics of the ambient power devices (block 710). In some embodiments, the ambient power devices can share the device characteristics with the AP. In certain embodiments, for example, the ambient power devices may share the device characteristics at the time of association with the AP. In more embodiments, for example, the ambient power devices can share the device characteristics with the AP periodically, i.e., at predetermined time intervals. In some more embodiments, the device characteristics may include, but are not limited to, transmission characteristics, charging characteristics, or identification characteristics. In numerous embodiments, examples of the transmission characteristics may include but are not limited to information about types of frames, for e.g., keepalive frames, scheduled updates, or triggered alarms, etc. In many more embodiments, the transmission characteristics can include information about transmission, for e.g., transmission type, frame sizes, or transmission intervals, etc. In still more embodiments, examples of the charging characteristics may include, but are not limited to, power requirements of the ambient power devices, i.e., a level of charge required by the ambient power devices to transmit one or more frames, an energy storage capacity of the ambient power devices, charging time for accumulating the energy storage capacity of the ambient power devices, or energy harvesting capacities of the ambient power devices etc. In many further embodiments, the device characteristics may include the identification characteristics, such as but not limited to, device identifiers of the ambient power devices or addresses of the ambient power devices, etc.

In a number of embodiments, the process 700 may determine the transmission type associated with the ambient power devices (block 720). In some embodiments, the transmission type can be indicative of one or more types of uplink frames transmitted by the ambient power devices. In certain embodiments, the transmission type may also be indicative of duration, length, periodicity, or other such parameters associated with the uplink frames.

In various embodiments, the process 700 can estimate the amount of charge received by the ambient power devices from the charging frames (block 730). In some embodiments, the amount of charge received by each ambient power device from one charging frame may vary according to the corresponding energy storage capacity of the ambient device. In certain embodiments, the process 700 can estimate the number of charging frames required for charging the ambient power devices to the predetermined level of charge required for transmission of the uplink frames. In more embodiments, the predetermined level of charge required for transmission of the uplink frames may vary according to the number of uplink frames transmitted by the ambient power devices in the TXOP.

In additional embodiments, the process 700 may determine, based on the transmission type and estimated amount of charge, the charging interval and the charging duration of the charging frames (block 740). In some embodiments, the charging interval and the charging duration can be different for different sets of ambient power devices. In certain embodiments, the process 700 can determine an optimum charging interval, charging duration, and/or the number of the charging frames to be transmitted to the ambient power devices to minimize the duty cycle consumed by the charging frames and also to ensure that the ambient power devices retain the sufficient amount of charge required for transmission of the uplink frames. In more embodiments, the charging duration may correspond to the length of the charging frame and the charging interval may correspond to a time gap between the charging frames.

In further embodiments, the process 700 can generate the charging instruction signal based on at least one of: the charging interval, the charging duration, or the device characteristics (block 750). In some embodiments, the charging instruction signal may be indicative of one or more of: the number of charging frames, the charging interval, or the charging duration, associated with the ambient power devices. In certain embodiments, the process 700 may generate distinct charging instruction signals for the different ambient power devices or for the different sets of ambient power devices. In more embodiments, the process 700 can transmit the charging instruction signal to corresponding wireless device.

Although a specific embodiment for the process 700 for generating the charging instruction signal for carrying out the various steps, processes, methods, and operations described herein is discussed with respect to FIG. 7, any of a variety of systems and/or processes may be utilized in accordance with embodiments of the disclosure. For example, the process 700 may optimize the charging of the ambient power devices by transmitting the charging instruction signals periodically or at quasi-static intervals. The elements depicted in FIG. 7 may also be interchangeable with other elements of FIGS. 1-6 and FIGS. 8-9 as required to realize a particularly desired embodiment.

Figure 8:
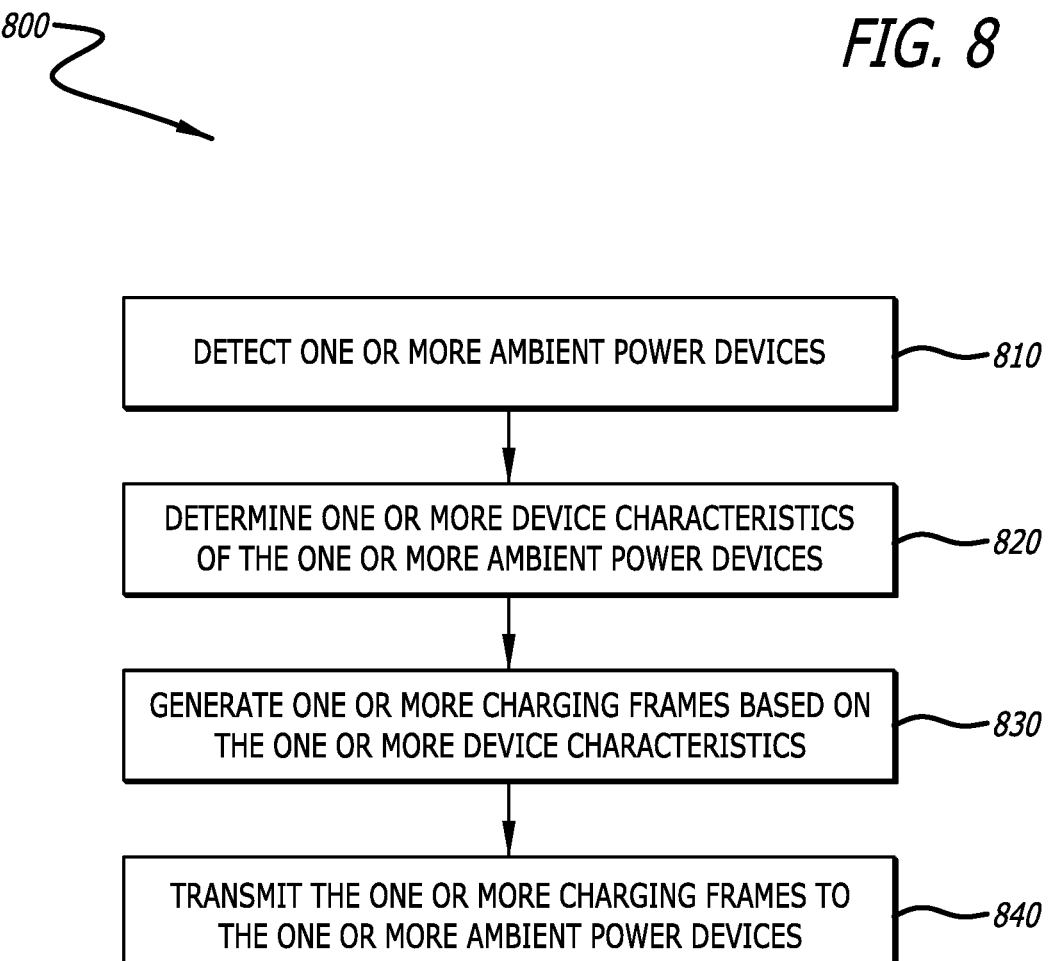
FIG. 8 is a flowchart depicting a process for transmitting one or more charging frames, in accordance with various embodiments of the disclosure.

Referring now to FIG. 8, a flowchart depicting a process 800 for transmitting the charging frames, in accordance with various embodiments of the disclosure is shown. In many embodiments, the process 800 can detect the ambient power devices (block 810). In some embodiments, the process 800 may be implemented by the AP. In certain embodiments, the ambient power devices may associate with the AP by way of one or more network protocols. In more embodiments, the process 800 can authenticate the ambient power devices. In some more embodiments, the process 800 may determine the RF channels for communicating with the ambient power devices.

In a number of embodiments, the process 800 may determine the device characteristics of the ambient power devices (block 820). In some embodiments, the ambient power devices may share the device characteristics at the time of association with the AP or periodically. In certain embodiments, the device characteristics may include, but are not limited to, the transmission characteristics, the charging characteristics, or the identification characteristics. In more embodiments, the process 800 can determine the topology of the ambient power devices based on the device characteristics.

In various embodiments, the process 800 can generate the charging frames based on the device characteristics (block 830). In some embodiments, the process 800 may determine the charging duration and the charging interval associated with the charging frames based on the device characteristics. In certain embodiments, the process 800 can estimate the charge accumulated by the ambient power devices per charging frame. In more embodiments, the process 800 may determine the number of charging frames required for charging each ambient power device.

In additional embodiments, the process 800 may transmit the charging frames to the ambient power devices (block 840). In some embodiments, the process 800 can perform off-channel charging by transmitting the charging frames on one RF channel and transmitting the downlink frames on another RF channel. In certain embodiments, the process 800 may receive one or more acknowledgement frames from the ambient power devices in response to the charging frames or the downlink frames.

Although a specific embodiment for the process 800 for transmitting the charging frames for carrying out the various steps, processes, methods, and operations described herein is discussed with respect to FIG. 8, any of a variety of systems and/or processes may be utilized in accordance with embodiments of the disclosure. For example, the process 800 may utilize ML techniques to optimize the generation and transmission of the charging frames and to create charging profiles of the ambient power devices. The elements depicted in FIG. 8 may also be interchangeable with other elements of FIGS. 1-7 and FIG. 9 as required to realize a particularly desired embodiment.

Figure 9:
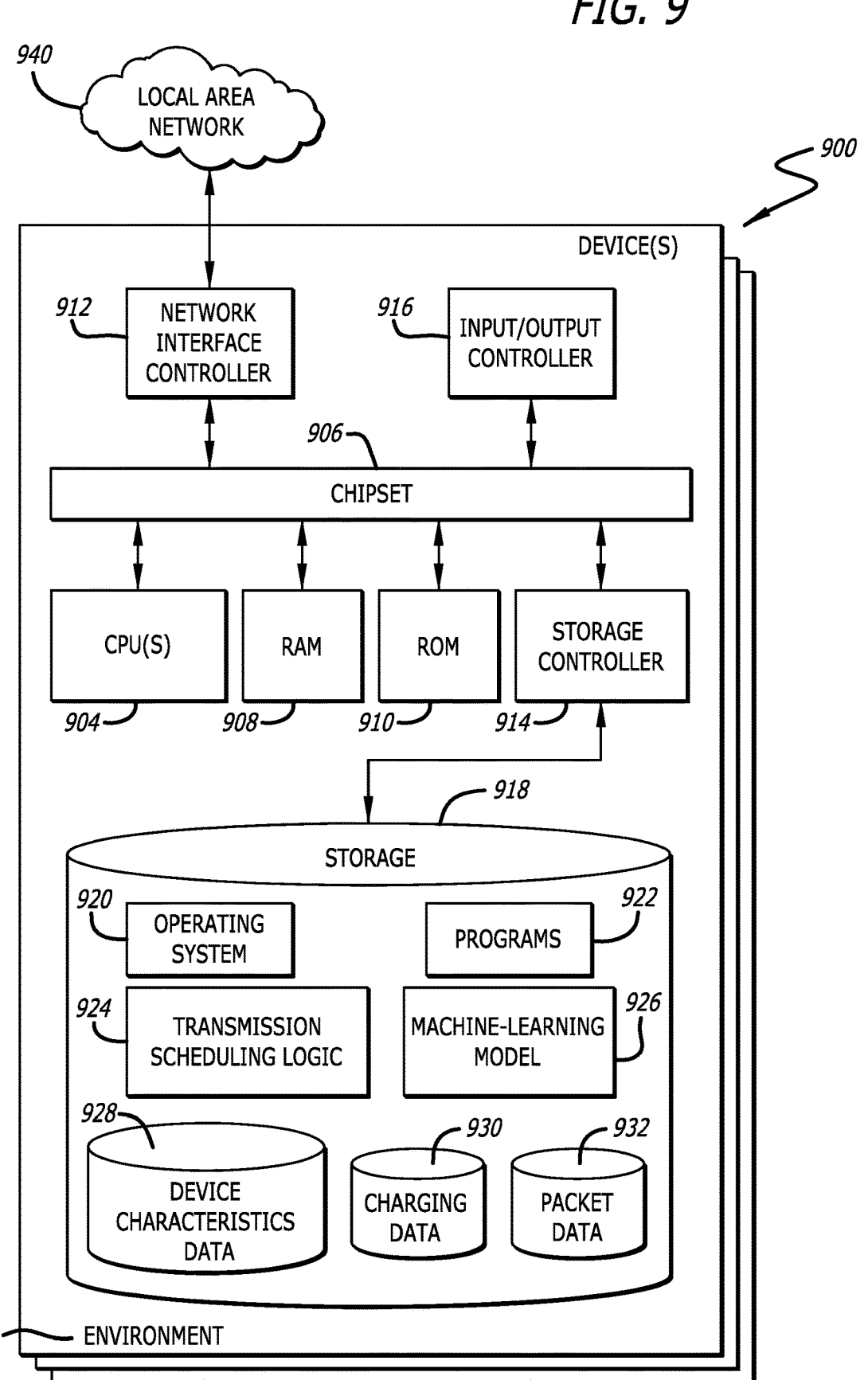
FIG. 9 is a conceptual block diagram of a device suitable for configuration with a transmission scheduling logic, in accordance with various embodiments of the disclosure.

Referring to FIG. 9, a conceptual block diagram of a device 900 suitable for configuration with a transmission scheduling logic, in accordance with various embodiments of the disclosure, is shown. The embodiment of the conceptual block diagram depicted in FIG. 9 can illustrate a conventional server, computer, workstation, desktop computer, laptop, tablet, network appliance, e-reader, smartphone, or other computing device, and can be utilized to execute any of the application and/or logic components presented herein. The embodiment of the conceptual block diagram depicted in FIG. 9 can also illustrate an access point, a switch, or a router in accordance with various embodiments of the disclosure. The device 900 may, in many non-limiting examples, correspond to physical devices or to virtual resources described herein.

In many embodiments, the device 900 may include an environment 902 such as a baseboard or "motherboard," in physical embodiments that can be configured as a printed circuit board with a multitude of components or devices connected by way of a system bus or other electrical communication paths. Conceptually, in virtualized embodiments, the environment 902 may be a virtual environment that encompasses and executes the remaining components and resources of the device 900. In more embodiments, one or more processors 904, such as, but not limited to, central processing units ("CPUs") can be configured to operate in conjunction with a chipset 906. The processor(s) 904 can be standard programmable CPUs that perform arithmetic and logical operations necessary for the operation of the device 900.

In a number of embodiments, the processor(s) 904 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In various embodiments, the chipset 906 may provide an interface between the processor(s) 904 and the remainder of the components and devices within the environment 902. The chipset 906 can provide an interface to a random-access memory ("RAM") 908, which can be used as the main memory in the device 900 in some embodiments. The chipset 906 can further be configured to provide an interface to a computer-readable storage medium such as a read-only memory ("ROM") 910 or non-volatile RAM ("NVRAM") for storing basic routines that can help with various tasks such as, but not limited to, starting up the device 900 and/or transferring information between the various components and devices. The ROM 910 or NVRAM can also store other application components necessary for the operation of the device 900 in accordance with various embodiments described herein.

Additional embodiments of the device 900 can be configured to operate in a networked environment using logical connections to remote computing devices and computer systems through a network, such as the network 940. The chipset 906 can include functionality for providing network connectivity through a network interface card ("NIC") 912, which may comprise a gigabit Ethernet adapter or similar component. The NIC 912 can be capable of connecting the device 900 to other devices over the network 940. It is contemplated that multiple NICs 912 may be present in the device 900, connecting the device to other types of networks and remote systems.

In further embodiments, the device 900 can be connected to a storage 918 that provides non-volatile storage for data accessible by the device 900. The storage 918 can, for instance, store an operating system 920, applications 922, device characteristics data 928, charging data 930, and packet data 932 which are described in greater detail below. The storage 918 can be connected to the environment 902 through a storage controller 914 connected to the chipset 906. In certain embodiments, the storage 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units. The device characteristics data 928 may store the device characteristics of the ambient power devices. In some embodiments, the device characteristics data 928 can store the transmission characteristics, charging characteristics, or identification characteristics. The charging data 930 can store the charging interval or the charging duration corresponding to the charging frames. In certain embodiments, the charging data 930 may store the mean charging interval of the charging frames associated with the ambient power devices or the sets of ambient power devices recorded by the device 900. The packet data 932 can store the uplink frames, downlink frames, or parameters of the frames exchanged with the ambient power devices. In more embodiments, the packet data 932 may include the data transmitted to the ambient power devices and/or the data received from the ambient power devices.

The device 900 can store data within the storage 918 by transforming the physical state of the physical storage units to reflect the information being stored. The specific transformation of physical state can depend on various factors. Examples of such factors can include, but are not limited to, the technology used to implement the physical storage units, whether the storage 918 is characterized as primary or secondary storage, and the like.

In many more embodiments, the device 900 can store information within the storage 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 900 can further read or access information from the storage 918 by detecting the physical states or characteristics of one or more particular locations within the physical storage units.

In addition to the storage 918 described above, the device 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 900. In some examples, the operations performed by a cloud computing network, and or any components included therein, may be supported by one or more devices similar to device 900. Stated otherwise, some or all of the operations performed by the cloud computing network, and or any components included therein, may be performed by one or more devices 900 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 918 can store an operating system 920 utilized to control the operation of the device 900. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 918 can store other system or application programs and data utilized by the device 900.

In many additional embodiments, the storage 918 or other computer-readable storage media is encoded with computer-executable instructions which, when loaded into the device 900, may transform it from a general-purpose computing system into a special-purpose computer capable of implementing the embodiments described herein. These computer-executable instructions may be stored as application 922 and transform the device 900 by specifying how the processor(s) 904 can transition between states, as described above. In some embodiments, the device 900 has access to computer-readable storage media storing computer-executable instructions which, when executed by the device 900, perform the various processes described above with regard to FIGS. 1-8. In certain embodiments, the device 900 can also include computer-readable storage media having instructions stored thereupon for performing any of the other computer-implemented operations described herein.

In many further embodiments, the device 900 may include a transmission scheduling logic 924. The transmission scheduling logic 924 can be configured to perform one or more of the various steps, processes, operations, and/or other methods that are described above. Often, the transmission scheduling logic 924 can be a set of instructions stored within a non-volatile memory that, when executed by the processor(s)/controller(s) 904 can carry out these steps, etc. In some embodiments, the transmission scheduling logic 924 may be a client application that resides on a network-connected device, such as, but not limited to, a server, switch, personal or mobile computing device in a single or distributed arrangement. The transmission scheduling logic 924 can charge the ambient power devices, schedule uplink transmissions from the ambient power devices, and/or transmit the charging frames to the ambient power devices.

In still further embodiments, the device 900 can also include one or more input/output controllers 916 for receiving and processing input from a number of input devices, such as a keyboard, a mouse, a touchpad, a touch screen, an electronic stylus, or other type of input device. Similarly, an input/output controller 916 can be configured to provide output to a display, such as a computer monitor, a flat panel display, a digital projector, a printer, or other type of output device. Those skilled in the art will recognize that the device 900 might not include all of the components shown in FIG. 9 and can include other components that are not explicitly shown in FIG. 9 or might utilize an architecture completely different than that shown in FIG. 9.

As described above, the device 900 may support a virtualization layer, such as one or more virtual resources executing on the device 900. In some examples, the virtualization layer may be supported by a hypervisor that provides one or more virtual machines running on the device 900 to perform functions described herein. The virtualization layer may generally support a virtual resource that performs at least a portion of the techniques described herein.

Finally, in numerous additional embodiments, data may be processed into a format usable by a machine-learning model 926 (e.g., feature vectors), and or other pre-processing techniques. The machine-learning ("ML") model 926 may be any type of ML model, such as supervised models, reinforcement models, and/or unsupervised models. The ML model 926 may include one or more of linear regression models, logistic regression models, decision trees, Naïve Bayes models, neural networks, k-means cluster models, random forest models, and/or other types of ML models 926.

The ML model(s) 926 can be configured to generate inferences to make predictions or draw conclusions from data. An inference can be considered the output of a process of applying a model to new data. This can occur by learning from at least the device characteristics data 928, the charging data 930, and the packet data 932 and use that learning to predict future outcomes. These predictions are based on patterns and relationships discovered within the data. To generate an inference, the trained model can take input data and produce a prediction or a decision. The input data can be in various forms, such as images, audio, text, or numerical data, depending on the type of problem the model was trained to solve. The output of the model can also vary depending on the problem, and can be a single number, a probability distribution, a set of labels, a decision about an action to take, etc. Ground truth for the ML model(s) 926 may be generated by human/administrator verifications or may compare predicted outcomes with actual outcomes.

Although a specific embodiment for the device 900 suitable for configuration with the transmission scheduling logic for carrying out the various steps, processes, methods, and operations described herein is discussed with respect to FIG. 9, any of a variety of systems and/or processes may be utilized in accordance with embodiments of the disclosure. For example, the device 900 may be in a virtual environment such as a cloud-based network administration suite, or it may be distributed across a variety of network devices or switches. The elements depicted in FIG. 9 may also be interchangeable with other elements of FIGS. 1-8 as required to realize a particularly desired embodiment.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:

a processor;

a memory communicatively coupled to the processor; and a transmission scheduling logic, configured to:

determine one or more device characteristics of a plurality of ambient power devices;

identify a set of overlapping ambient power devices of the plurality of ambient power devices in communication with a wireless device; and transmit, to the wireless device, a charging instruction signal based on the one or more device characteristics;

transmit an authorization signal to the wireless device, wherein the authorization signal is indicative of allowing transmission of uplink frames from one ambient power device of the set of overlapping ambient power devices at a time; and schedule transmissions of the uplink frames from two or more overlapping ambient power devices at different times by allocating distinct time slots to the overlapping ambient power devices for uplink transmissions to avoid collisions of the uplink frames.

2. The device of claim 1, wherein the set of overlapping ambient power devices receive, from the wireless device, one or more charging frames based on the charging instruction signal.

3. The device of claim 2, wherein the transmission scheduling logic is further configured to receive one or more uplink frames from one or more ambient power devices of the plurality of ambient power devices.

4. The device of claim 3, wherein the one or more uplink frames are relayed from the one or more ambient power devices by the wireless device.

5. The device of claim 3, wherein the one or more device characteristics comprise at least one of:

an energy storage capacity of the one or more ambient power devices;

a charging time associated with the energy storage capacity of the one or more ambient power devices, or a level of charge required by the one or more ambient power devices for transmitting the one or more uplink frames.

6. The device of claim 5, wherein the transmission scheduling logic is further configured to:

determine a transmission type associated with the one or more ambient power devices; and estimate an amount of charge received by the one or more ambient power devices from the one or more charging frames.

7. The device of claim 6, wherein the transmission scheduling logic is further configured to determine, based on the transmission type and estimated amount of charge, a charging interval and a charging duration of the one or more charging frames transmitted to the one or more ambient power devices.

8. The device of claim 7, wherein the charging instruction signal is generated based on at least one of: the charging interval, the charging duration, or the one or more device characteristics.

9. The device of claim 8, wherein the one or more ambient power devices receive one or more downlink frames on a first channel and the one or more charging frames on a second channel.

10. The device of claim 8, wherein the transmission scheduling logic is further configured to determine a mean charging interval of the one or more charging frames.

11. The device of claim 8, wherein the transmission type is indicative of a type of the one or more uplink frames transmitted by the one or more ambient power devices.

12. The device of claim 8, wherein the transmission scheduling logic is further configured to:

detect violation of the charging instruction signal by the wireless device; and generate an alarm signal upon detecting the violation of the charging instruction signal by the wireless device.

13. The device of claim 8, wherein the transmission scheduling logic is further configured to detect a change in position or state of the one or more ambient power devices.

14. The device of claim 13, wherein the transmission scheduling logic is further configured to update at least one of: the set of overlapping ambient power devices, the charging interval, or the charging duration based on the change in position or state of the one or more ambient power devices.

15. A device, comprising:

a processor;

a memory communicatively coupled to the processor; and a transmission scheduling logic, configured to:

detect one or more ambient power devices;

determine one or more device characteristics of the one or more ambient power devices;

generate one or more charging frames based on the one or more device characteristics; and transmit the one or more charging frames to the one or more ambient power devices;

identify a set of overlapping ambient power devices of the one or more ambient power devices in communication with a wireless device;

transmit an authorization signal to the wireless device; and schedule transmissions of the uplink frames from two or more overlapping ambient power devices at different times by allocating distinct time slots to the overlapping ambient power devices for uplink transmissions to avoid collisions of the uplink frames.

16. The device of claim 15, wherein the one or more device characteristics comprise at least one of:

an energy storage capacity of the one or more ambient power devices;

a charging time associated with the energy storage capacity of the one or more ambient power devices, or a level of charge required by the one or more ambient power devices for transmitting one or more uplink frames.

17. The device of claim 16, wherein the transmission scheduling logic is further configured to:

determine a transmission type of the one or more uplink frames;

estimate an amount of charge received by the one or more ambient power devices from the one or more charging frames; and determine an interval and a duration of the one or more charging frames based on corresponding transmission type and estimated amount of charge.

18. A method comprising:

determining one or more device characteristics of a plurality of ambient power devices;

identifying a set of overlapping ambient power devices of the plurality of ambient power devices in communication with a wireless device; and transmitting, to the wireless device, a charging instruction signal based on the one or more device characteristics;

transmitting an authorization signal to the wireless device; and scheduling transmissions of the uplink frames from two or more overlapping ambient power devices at different times by allocating distinct time slots to the overlapping ambient power devices for uplink transmissions to avoid collisions of the uplink frames.

19. The method of claim 18, wherein the one or more device characteristics comprise at least one of:

an energy storage capacity of the plurality of ambient power devices;

a charging time associated with the energy storage capacity of the plurality of ambient power devices, or a level of charge required by the plurality of ambient power devices for transmitting one or more uplink frames.

\* \* \* \* \*